United States Patent
Hagl et al.

(10) Patent No.: US 7,367,133 B2
(45) Date of Patent: May 6, 2008

(54) DEVICE AND METHOD FOR COORDINATE MEASUREMENT

(75) Inventors: Rainer Hagl, Altenmarkt (DE); Herbert Reiter, Engelsberg (DE); Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/597,445

(22) PCT Filed: Apr. 15, 2005

(86) PCT No.: PCT/EP2005/003966

§ 371 (c)(1),
(2), (4) Date: Nov. 22, 2006

(87) PCT Pub. No.: WO2005/119173

PCT Pub. Date: Dec. 15, 2005

(65) Prior Publication Data

US 2007/0245584 A1   Oct. 25, 2007

(30) Foreign Application Priority Data

May 27, 2004  (DE) ...................... 10 2004 026 022
Mar. 11, 2005  (DE) ...................... 10 2005 011 285

(51) Int. Cl.
  *G01B 7/008* (2006.01)
(52) U.S. Cl. .......................................... 33/561; 33/503
(58) Field of Classification Search .......... 33/556–561, 33/503
See application file for complete search history.

(56) References Cited

U.S. PATENT DOCUMENTS 4,484,118 A   11/1984   Manabe et al.

(Continued)

FOREIGN PATENT DOCUMENTS

DE   100 50 795   7/2001

(Continued)

OTHER PUBLICATIONS

International Search Report, PCT International Patent Application No. PCT/EP2005/003966, dated Aug. 2, 2005.

*Primary Examiner*—G. Bradley Bennett
(74) *Attorney, Agent, or Firm*—Kenyon & Kenyon LLP (57) ABSTRACT

In a device and a method for coordinate measurement, a probe head generates a switching signal in response to contact with a workpiece. The device includes position-measuring units for each coordinate axis to be measured, with the aid of which the relative position of the probe head is measurable; and a processing unit, which operates in a discrete-time manner in time intervals of a controller clock signal. For coordinate measurement, position-measuring values are measured in time intervals of a probing clock signal, which is generated by a probing clock generator and has a higher frequency than a controller clock signal of a processing unit. The position-measuring values are stored in a position-data memory. A time span between a pulse of the controller clock signal and the occurrence of the switching signal at the switching probe head is measured in a time-measuring unit. With the aid of the measured time span, the position value in the position-data memory closest to the time of the switching signal is ascertained in the processing unit or in the position-measuring units.

11 Claims, 4 Drawing Sheets

U.S. PATENT DOCUMENTS

| | | | |
|---|---|---|---|
| 4,896,110 A * | 1/1990 | Shimizu et al. | 33/558 |
| 5,189,806 A | 3/1993 | McMurtry et al. | |
| 5,862,604 A * | 1/1999 | Fuchs et al. | 33/503 |
| 5,949,352 A * | 9/1999 | Ferrari | 33/561 |
| 6,044,569 A * | 4/2000 | Ogihara et al. | 33/503 |
| 6,487,785 B1 * | 12/2002 | Ritz | 33/561 |
| 7,145,468 B2 * | 12/2006 | Collingwood et al. | 33/503 |
| 2002/0185998 A1 | 12/2002 | Beck | |
| 2003/0086095 A1 | 5/2003 | Ruck | |
| 2006/0016087 A1 * | 1/2006 | Schopf | 33/561 |
| 2007/0068024 A1 * | 3/2007 | Fuge et al. | 33/559 |

FOREIGN PATENT DOCUMENTS

EP     0 073 495     3/1983

* cited by examiner

DEVICE AND METHOD FOR COORDINATE MEASUREMENT

FIELD OF THE INVENTION

The present invention relates to a device and a method for coordinate measurement at a workpiece.

BACKGROUND INFORMATION

In numerically controlled machine tools, in particular milling machines, switching probe heads are often used for carrying out automated coordinate measurements. Such probe heads have a stylus, which triggers a switching event when it contacts an obstacle, such as the surface of a workpiece. Typical fields of application for automated measurements include the aligning of workpieces, setting of reference points, measuring of workpieces for quality control, and the digitizing of three-dimensional workpiece surfaces.

To carry out the measurements, the probe head is inserted into the tool spindle in place of a tool. In this manner, it may be positioned in the different coordinate axes by the numerical control unit of the machine tool. For coordinate measurement, the probe head, controlled by the numerical control unit, is moved towards the workpiece until a switching event indicates that the surface of the workpiece has been reached. This operation is referred to as a probing operation. During the probing operation, the spatial position of the probe head in or with respect to the coordinate axes to be measured is continuously measured by position-measuring devices in time intervals determined by the cycle time of the numerical control unit, and the position values are transmitted to the numerical control unit. The position values are needed by the numerical control unit as actual position values for its internal control loops. Customary cycle times are, for example, on the order of 50 µs.

Since, in this procedure, the position values are ascertained in a discrete-time manner in fixed time intervals, but the switching event occurs asynchronously to this, a measuring error results that increases with the probing speed and the cycle time. This measuring error adds to the general measuring error of the machine tool and therefore reduces the quality of the overall system. If, for example, one takes the above-mentioned cycle time of 50 µs and a probing speed of 1 m/min, then a maximum position error of approximately 0.83 µm results. That corresponds to the distance that the probe head travels in 50 µs at a probing speed of 1 m/min. In many cases, an additional position error of this magnitude is not acceptable.

Since the cycle time of numerical control units, as is conventional, cannot be influenced, reducing the probing speed is mostly the only option for reducing the additional position error produced by the discrete-time method of functioning. However, this also results in a lower throughput and, therefore, reduction of economic efficiency.

European Published Patent Application No. 0 073 495 describes a compromise between high probing speed and low position error. Described is a method for coordinate measurement, where a first probing is carried out at high probing speed, the probe head is subsequently moved a short distance away from the workpiece surface again, and the probing is repeated at a lower probing speed. A higher accuracy is attained, using the lower probing speed during the second probing operation. The disadvantage of this method is that it sets high requirements for the programming of the numerical control unit, and the time expenditure from the two-time change of direction cannot be significantly reduced.

SUMMARY

Example embodiments of the present invention provide a method for coordinate measurement, which has a high probing speed in conjunction with a high accuracy.

Example embodiments of the present invention provide a device for coordinate measurement, with the aid of which the measurement of coordinates on workpieces may be carried out at a high probing speed with simultaneous, high accuracy.

A device for coordinate measurement includes a probe head that generates switching signal in response to contact with a workpiece, position-measuring units for each coordinate axis to be measured, by which the relative position of the probe head is measurable, and a processing unit that operates in a discrete-time manner in time intervals of a controller clock signal. To measure coordinates, position measuring values are measured in time intervals of a probing clock signal, which is generated by a probing clock generator and has a frequency higher than the controller clock signal of the processing unit. The position-measuring values are stored in a position-data memory. In one time-measurement unit, a time span Δt between a pulse of the controller clock signal and the generation of the switching signal at the switching probe head is determined. The position value in the position-data memory closest to the time of the switching signal is ascertained in the processing unit or in the position-measuring units in view of measured time span Δt.

The probing clock generator and the position-data memory for storing the position values may be arranged in the position-measuring unit. As such, the number of position values having to be transmitted from the position-measuring unit to the processing unit may be considerably reduced. This is particularly the case when the data transmission between the position-measuring units and the processing unit takes place via serial interfaces.

Furthermore, the probing clock signal may be synchronized with the controller clock signal, in order to provide an exact temporal relationship between the occurrence of a switching event, whose time is measured relative to the controller clock signal of the processing unit, and the position-measuring values.

According to an example embodiment of the present invention, a method for coordinate measurement at a workpiece by a device for coordinate measurement, which includes a probe head that generates a switching signal in response to contact with the workpiece, position-measuring units for each coordinate axis to be measured, a relative position of the probe head measurable with the position-measuring units, and a processing unit that functions in a discrete-time manner in time intervals of a controller clock signal, includes: measuring position values in time intervals of a probing clock signal having a higher frequency than the controller clock signal of the processing unit; storing the position values in a position-data memory; measuring a time span between a pulse of the controller clock signal and an occurrence of the switching signal at the probe head in a time-measuring unit; and ascertaining, in one of (a) the processing unit and (b) the position-measuring unit, a position value from the stored position values in position-data memory closest to a time of the switching signal in accordance with the measured time span.

According to an example embodiment of the present invention, a device for coordinate measurement at a workpiece includes: a probe head adapted to generate a switching signal in response to contact with the workpiece; position-measuring units for each coordinate axis to be measured, a relative position of the probe head measurable with the position-measuring units; a processing unit adapted to function in a discrete-time manner in time intervals of a controller clock signal; at least one probing clock generator adapted to generate a probing clock signal having a higher frequency than the controller clock signal of the processing unit and controlling measurement of position values in the position-measuring units; at least one position-data memory adapted to store position values; and a time-measuring unit, the switching signal transmittable to the time-measuring unit, the time-measuring unit adapted to measure a time span between a pulse of the controller clock signal and an arrival of the switching signal. At least one of (a) the processing unit and (b) each position-measuring unit includes a determination device adapted to determine a position value in the position-data memory closest to a time of arrival of the switching signal in accordance with the measured time span.

According to an example embodiment of the present invention, a device for coordinate measurement at a workpiece includes: probe head means for generating a switching signal in response to contact with the workpiece; position-measuring means for each coordinate axis to be measured, the position-measuring means for measuring a relative position of the probe head means; processing means that functions in a discrete-time manner in time intervals of a controller clock signal; at least one probing clock generating means for generating a probing clock signal having a higher frequency than the controller clock signal of the processing means and controlling measurement of position values in the position-measuring means; at least one position-data memory means for storing position values; and time-measuring means, the switching signal transmittable to the time-measuring means, the time-measuring means for measuring a time span between a pulse of the controller clock signal and an arrival of the switching signal. At least one of (a) the processing means and (b) each position-measuring means includes determining means for determining a position value in the position-data memory means closest to a time of arrival of the switching signal in accordance with the measured time span.

Further aspects and details of example embodiments of the present invention are described in more detail below with reference to the appended Figures.

DETAILED DESCRIPTION

Figure 1:
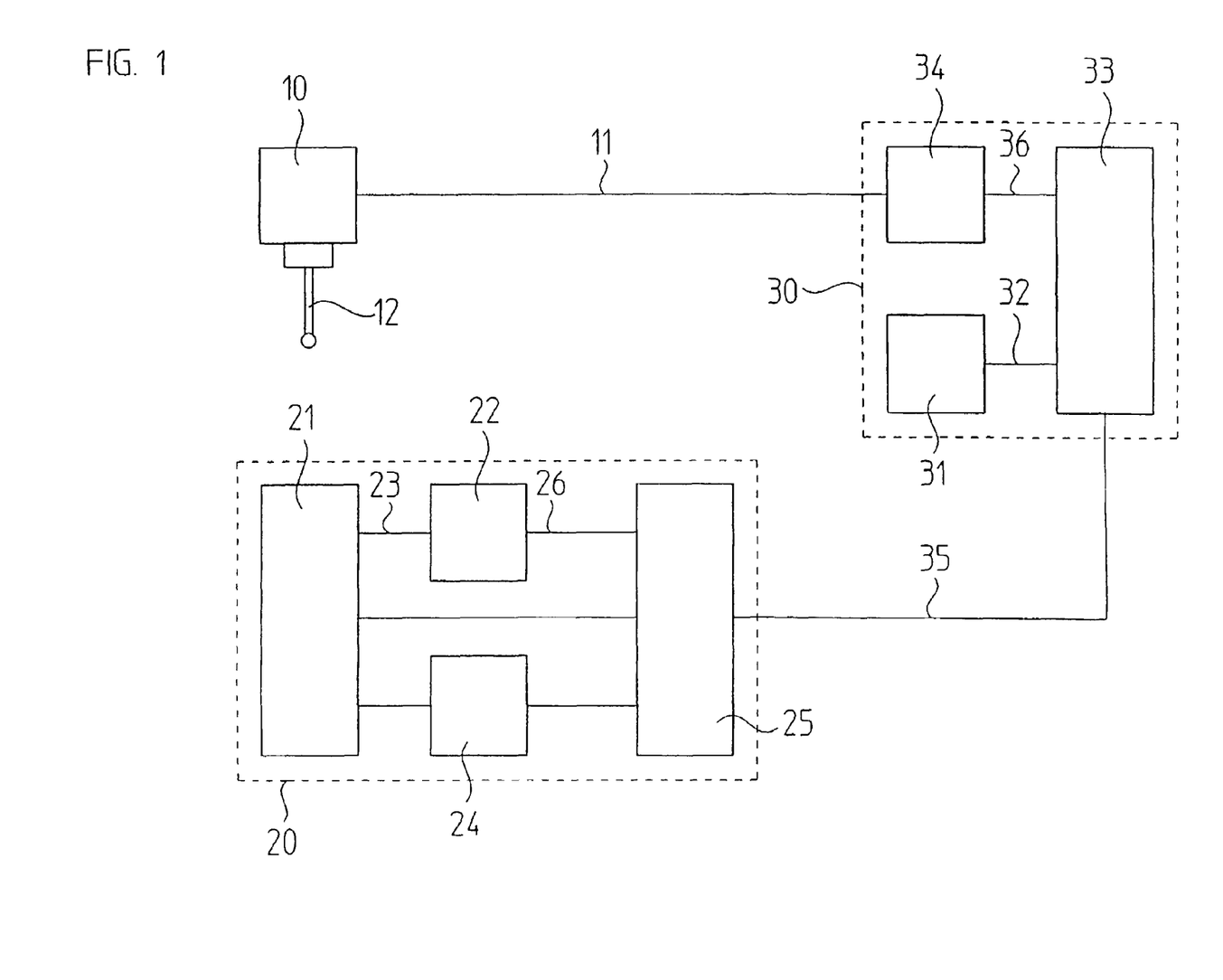
FIG. 1 is a block diagram of a device for coordinate measurement according to an example embodiment of the present invention.

FIG. 1 is a block diagram of a device for coordinate measurement according to an example embodiment of the present invention. It includes a probe head 10 having a stylus 12, position-measuring units 20 for each coordinate axis to be measured, as well as a processing unit 30.

Probe head 10 generates switching signal when stylus 12 is deflected in response to contacting a workpiece. The switching signal is transmitted through a switching line 11 to processing unit 30 and signals that the probing operation is ended. Switching line 11 may be a conventional cable connection, as well as an infrared transmission link.

Processing unit 30 is, in principle, a numerical control unit. It includes, inter alia, control loops, which are capable of controlling drive units that position probe head 10. Such numerical control units are conventional. Therefore, only relevant functions are described below.

A controller clock generator 31, a control unit 33, and a time-measuring unit 34 are situated in processing unit 30.

Controller clock generator 31 provides a time base for control unit 33, using a controller clock signal, the time base defining the frequency at which the control loops in control unit 33 operate, as well as the time intervals in which position-measuring values are requested by position-measuring units 20. The period of controller clock signal 32 is also referred to as cycle time.

Control unit 33 controls the probing operation. In order to request and transmit position-measuring values, the control unit is connected to position-measuring units 20 via a first date-transmission channel 35. The data transmission occurs, e.g., in serial form.

Time-measuring unit 34 is used for measuring a time span $\Delta t$ between the beginning of a controller clock-pulse period and a switching event at probe head 10. In this connection, either the rising or the falling edge of controller clock signal 32 is normally selected as the beginning of a controller clock-pulse period. Time-measuring unit 34 is connected to control unit 33 via a second data-transmission channel 36. In addition, the time-measuring unit receives the switching signal of probe head 10 via switching line 11. At the beginning of each controller clock-pulse period, time-measuring unit 34 is reset and restarted by control unit 33 via second data-transmission channel 36. In addition, the occurrence of a switching event is signaled to, and time span $\Delta t$ transmitted to, control unit 33 via second data-transmission channel 35.

Position-measuring unit 20 includes a position-measuring device 21, a probing clock generator 22, a position-data memory 24, and an interface unit 25. Although only one position-measuring device 20 is illustrated in FIG. 1, it should be appreciated that depending on the number of coordinate axes to be measured, a plurality of position-measuring units 20 may be provided.

Both probing clock generator 22 and position-data memory 24 may be situated in position-measuring unit 20, since this reduces the number of position values that must be transmitted to processing unit 30. This advantage is particularly realized, when the exchange of data between position-measuring unit 20 and processing unit 30 takes place via a serial interface. If, for example, the data-transmission rate is 2 Mbit/s, then the serial transmission of a position value having a width of 32 bit lasts at least 16 µs. If the 50 µs already mentioned above is assumed to be the cycle time of processing unit 30, that would mean that only a maximum of two additional position values could be measured per period of controller clock signal 32. This limitation is circumvented by the arrangement of position-measuring unit 20 provided in FIG. 1.

Conventional devices, which make the position data available in digital form, may be used as position-measuring device 21. Probing clock generator 22 generates a probing clock signal 23 that stipulates a time base, in which position values are requested by position-measuring device 21 during the probing operation. In this context, probing clock signal 23 has a higher frequency than controller clock signal 32. An integral multiple of the frequency of controller clock signal 32 may be selected for the frequency of probing clock signal 23. In addition, it may be provided to synchronize probing clock signal 23 with controller clock signal 32, in order to provide an exact temporal relationship between the two clock signals.

Interface unit 25 is connected to control unit 33 via first data-transmission channel 35. Position values may be requested either from position-data memory 24 or directly from position-measuring device 21, and transmitted to control unit 33, via interface unit 25. In addition, it provides probing clock generator 22 with a synchronization signal 26 and stops the acquisition and storage of position values, when it is transmitted a corresponding command via first data-transmission channel 35.

The position data are stored in position-data memory 24. Position-data memory 24 must contain at least so many storage locations, that after the end of the probing operation, the position value temporally closest to the probing time is in position-data memory 24. Storage locations, which contain position values that are no longer needed, may be overwritten. Therefore, position-data memory 24 may be designed as a cyclically overwritable, circular buffer. That is, the position value to be currently stored overwrites the oldest position value in position-data memory 24 no longer needed.

The ascertainment of the storage requirement for position-data memory 24 is explained in view of the following example. If the frequency of probing clock signal 23 corresponds to ten times the frequency of controller clock-pulse signal 32, and the communication between processing unit 30 and position-measuring unit 20 takes place in a discrete-time manner at an interval of the period of controller clock-pulse signal 32, then ten position values must be stored per controller clock-pulse period. The reason for this is that the switching signal from probe head 10 may be received at any arbitrary time between two communication times. Each of the position values in position-data memory 24, which was measured since the last instance of access of processing unit 30 to position-measuring unit 20, may therefore be the one closest to the switching signal.

During the probing operation, probe head 10, controlled by processing unit 30, is moved towards the workpiece to be measured. In this context, position values are continuously requested by control unit 33 from position-measuring devices 21 at a time interval of the period of controller clock-pulse signal 32, via first data-transmission channel 35 and interface unit 25. Control unit 33 needs these position values as actual position values for the control loops for controlling the drive units. When a position-data request is received, interface unit 25 synchronizes probing clock signal 23 with controller clock-pulse signal 32, using synchronization signal 26. In addition, time-measuring unit 34 is reset and restarted by control unit 33, via second data-transmission channel 36, at the beginning of each controller clock-pulse period. Position values are measured and stored in position-data memory 24 concurrently to this, at the time interval of the period of probing clock signal 23.

Using a signal on switching line 11, probe head 10 signals to processing unit 30 when stylus 12 has been deflected in response to contacting the workpiece. As a result, control unit 33 stops the drive units, and time span $\Delta t$ between the beginning of the controller clock-pulse period and the switching event is retained in time-measuring unit 34. In addition, it must be communicated to position-measuring unit 20 that no more additional position data are needed. This may take place, for example, as illustrated in FIG. 1, by transmitting a command word to interface unit 25 via first data-transmission channel 35. As an alternative to this, switching line 11 may additionally be connected to position-measuring unit 20 and stop probing clock generator 22 in the case of a switching event.

With the aid of time span $\Delta t$ and the known temporal relationship between controller clock signal 32 and probing clock signal 23, the position value in position-data memory 24 closest to the switching event may be ascertained in control unit 33 and transmitted, for further processing, to control unit 33 via first data-transmission channel 35 and interface unit 25.

When determining the position value closest to the switching event, the propagation time of the switching signal up to arrival in processing unit 30 may be considered as well. This may be the case, when switching line 11 does not take the form of an electric line, but rather a wireless transmission link, in which the switching signal is transmitted, for example, with the aid of infrared-light pulses. The propagation time of the switching signal may be stored, for example, in the control unit.

Figure 2:
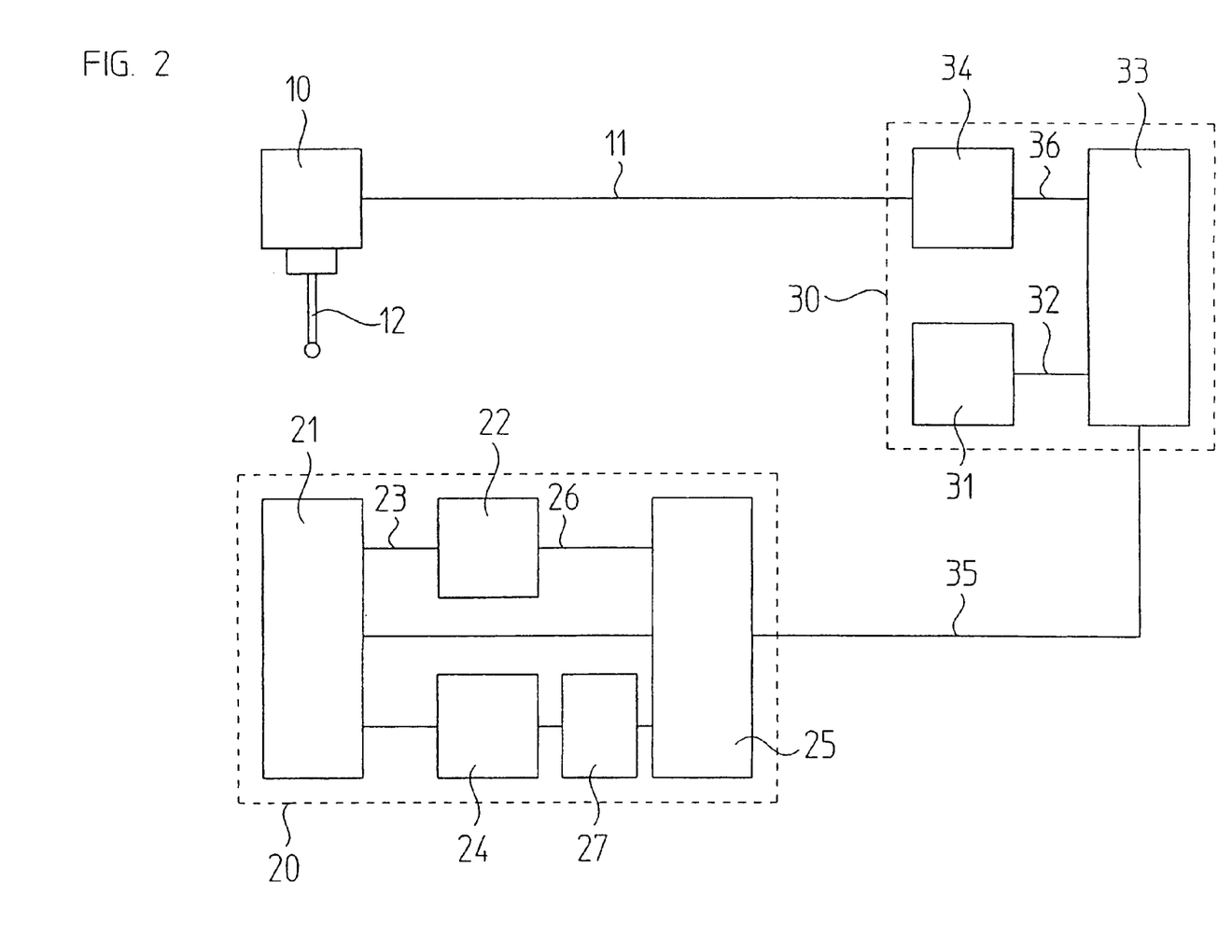
FIG. 2 is a block diagram of a device for coordinate measurement according to an example embodiment of the present invention.

FIG. 2 is a block diagram of a device for coordinate measurement according to an example embodiment of the present invention. Unlike the example illustrated in FIG. 1, each position-measuring unit 20 in FIG. 2 additionally includes an evaluation unit 27. The further arrangement corresponds to that illustrated in FIG. 1. Identical components are provided with the same reference numerals. No further explanation of them will be given.

If probe head 10 signals to processing unit 30 via switching line 11, that the surface of the workpiece has been reached, then, in this example embodiment, the position value closest to the probing time is not ascertained in processing unit 30, by control unit 33, but rather in position-measuring unit 20, by evaluation unit 27. For this purpose, control unit 33 transmits time span $\Delta t$ measured by time-measuring unit 34 to evaluation unit 27 via first data-transmission channel 35 and interface unit 25. Using time span $\Delta t$, this ascertains the position value in position-data memory 24 closest to the probing time and transmits it to processing unit 30.

In this example, the propagation time of the switching signal may be taken into account in that either control unit 33 corrects measured time span $\Delta t$, using the propagation time, and transmits the corrected value to evaluation unit 27, or evaluation unit 27 takes into account the signal propagation time while ascertaining the result.

According to this method, the workload of control unit 33, whose capacity is highly utilized during the probing operation, is substantially reduced by this.

Figure 3:
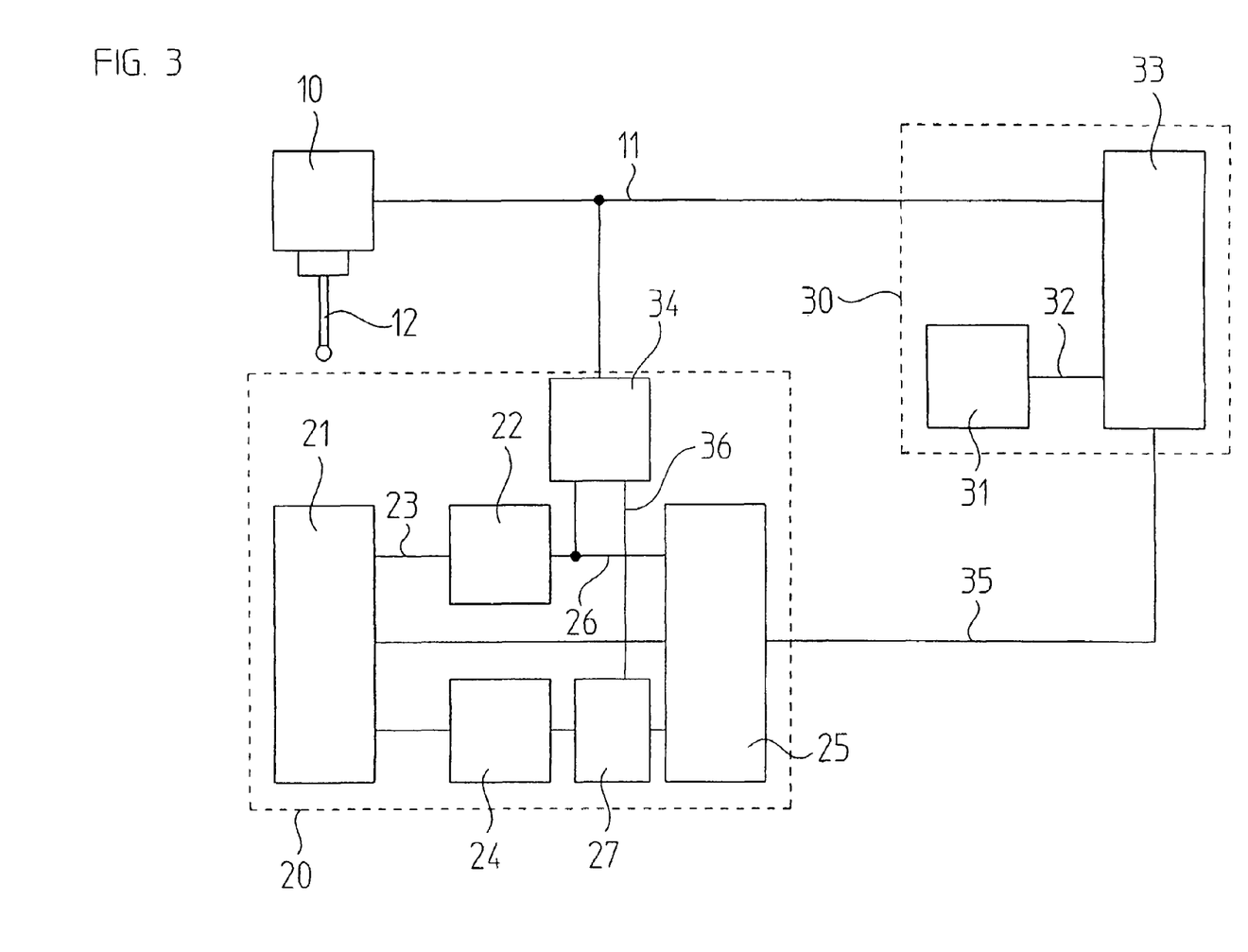
FIG. 3 is a block diagram of a device for coordinate measurement according to an example embodiment of the present invention.

FIG. 3 is a block diagram of a device for coordinate measurement according to an example embodiment of the present invention. In comparison with the preceding examples, time-measuring unit 34 is no longer in processing unit 30. Instead, a time measuring unit 34 is provided in each position-measuring unit 20. As in the example embodiment illustrated in FIG. 2, position-measuring units 20 include an evaluation unit 27 in the example embodiment illustrated in FIG. 3 as well. The further arrangement corresponds to that illustrated in FIG. 1. Therefore, it is not described again. Identical components are provided with the same reference numerals.

Switching line 11, via which probe head 10 outputs the switching signal, is connected to each time-measuring unit 34 and to control unit 33 in processing unit 30. In this context, the connection to time-measuring unit 34 is used for stopping the time measurement in response to the occurrence of a switching signal. Control unit 33 is informed via switching line 11, that the probing operation is ended and the drive units are therefore stopped, and that the position values corresponding to the probing event may be requested by position-measuring units 20. Since, in this exemplary embodiment, switching line 11 is connected to a plurality of components spatially separated from one another, it may be provided that the connection is not implemented by electrical lines, but rather by wireless transmission links. Suitable wireless transmission links may be formed, for example, by high-frequency transmitter and receiver units, or also by infrared transmitters and receivers.

Within position-measuring unit 20, synchronization signal 26 is not only transmitted to probing clock generator 22, but also to time-measuring unit 34. This allows time-measuring unit 34 to be reset in response to each position-data request. Since the position-data requests continue to occur in a discrete-time manner in time intervals of controller clock signal 32, time span $\Delta t$ between a pulse of controller clock signal 32 and the occurrence of the switching signal at switching probe head 10 therefore continues to be measurable as well.

Time-measuring unit 34 is connected to evaluation unit 27 via second data-transmission channel 36. Time span $\Delta t$ measured by time-measuring unit 34 is transmittable to evaluation unit 27 via the second data-transmission channel. Using this information, it is, in turn, possible for evaluation unit 27 to ascertain the position value in position-data memory 24 closest to the time at which the switching signal occurs at switching probe head 10. In this exemplary embodiment, it may be provided that evaluation unit 27 takes into account the propagation time of the switching signal in the determination of the position value closest to the switching event. The resulting position value may be transmitted either automatically or per request of processing unit 30, from evaluation unit 27 to control unit 33 via interface unit 25 and first data-transmission channel 35.

Since, in this example embodiment, the determination of time span $\Delta t$ is also carried out in position-measuring units 20, the workload of processing unit 20 is even further reduced in comparison with the preceding examples.

Figure 4:
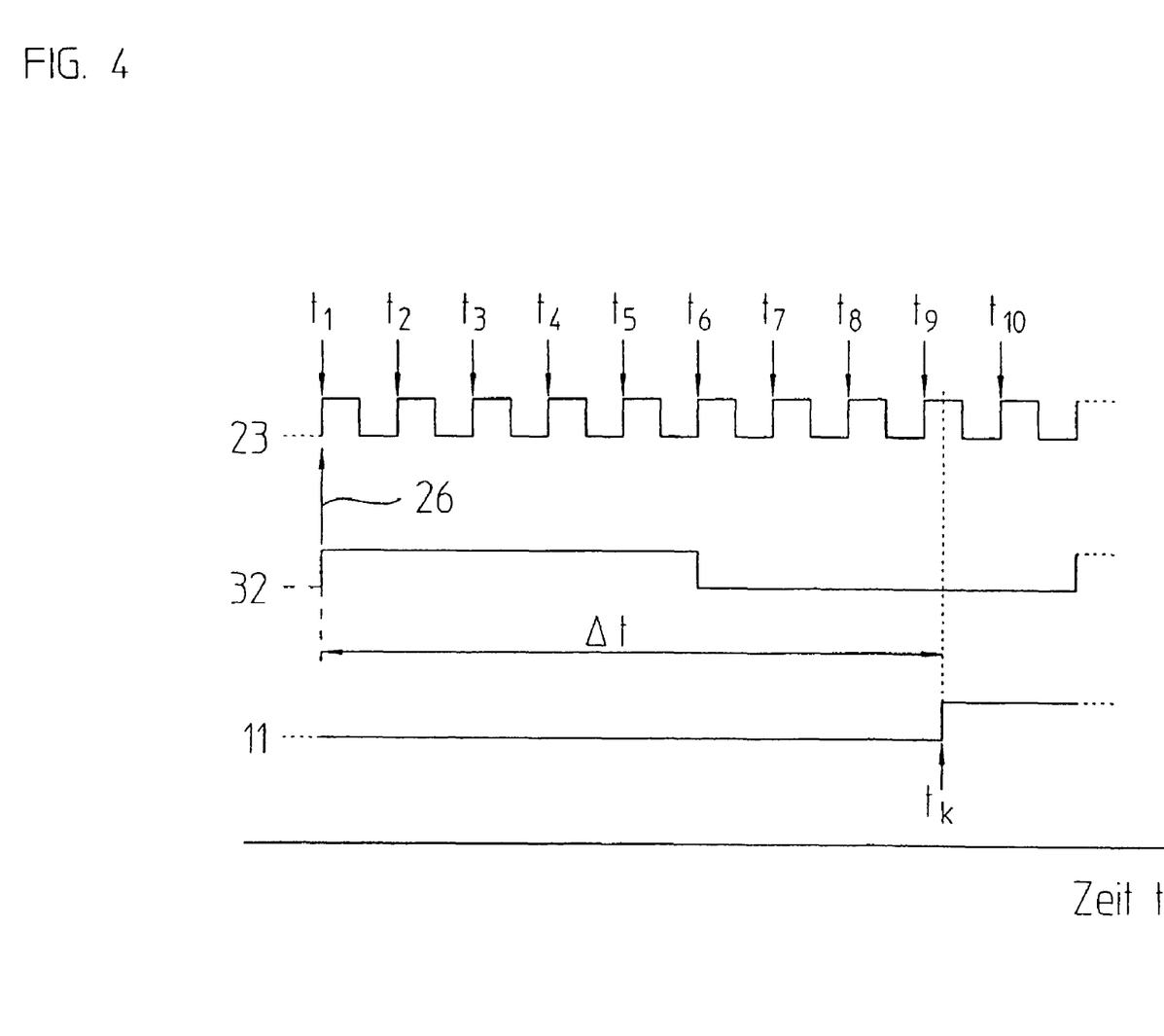
FIG. 4 is a timing diagram for explaining the time sequence of a method for coordinate measurement according to an example embodiment of the present invention.

FIG. 4 is a simplified timing diagram of a method for coordinate measurement according to an example embodiment of the present invention, in which the temporal relationship between controller clock signal 32, probing clock signal 23, and switching line 11 of probe head 10 is represented in detail. In this example, probing clock signal 23 has a frequency ten times that of controller clock signal 32.

At time $t_1$, a controller clock-pulse period begins with a rising edge of controller clock signal 32. At this time, time-measuring unit 34 is reset and restarted via second data-transmission channel 36. In addition, a position value from position-measuring unit 20 is requested by control unit 33 via first data-transmission channel 35 and interface unit 25. Probing clock signal 23 is synchronized with controller clock signal 32 by synchronization signal 26, at the same time as the position-data request. Position values are then measured in position-measuring device 21 of position-measuring unit 20 at times $t_1, t_2, \ldots, t_{10}$ and stored in position-data memory 24.

At contact time $t_k$, a voltage-level change on switching line 11 signals the contact of stylus 12 with the workpiece. As a result, the time measurement in time-measuring unit 34 is stopped and the exact time of the switching signal with respect to the rising edge of controller clock signal 32 is available in the form of measured time span $\Delta t$. Time span $\Delta t$ is transmitted via second transmission channel 36 to control unit 33, which subsequently ascertains the position value closest to the switching event. In the case of the example illustrated in FIG. 4, the position value measured at time $t_9$ is closest to contact time $t_k$ and therefore constitutes the result of the probing operation. This position value may be transmitted via first data-transmission channel 35 to control unit 33 and further processed there.

Since the position values in position-data memory 24 are assigned exact measuring times $t_1, t_2, \ldots, t_{10}$, the accuracy of the result may be further improved by interpolation. The position value prior to, and the position value after, contact time $t_k$, as well as the value of time span $\Delta t$, are needed for this. Since the rate of advance of probe head 10 during the probing operation may be assumed to be constant, a linear relationship is produced between the two position values, via which the exact position value after the elapsing of time span $\Delta t$ may be interpolated.

In an analogous manner, it is possible to improve the accuracy of the result by extrapolation, using the ascertained position value closest to contact time $t_k$, time span $\Delta t$, and the known probing speed.

It should be appreciated the described example embodiments of a device for coordinate measurement, as well as of the method for coordinate measurement at a workpiece, may be modified and adapted to many different requirements.

What is claimed is:

1. A method for coordinate measurement at a workpiece by a device for coordinate measurement, which includes a probe head that generates a switching signal in response to contact with the workpiece, position-measuring units for each coordinate axis to be measured, a relative position of the probe head measurable with the position-measuring units, and a processing unit that functions in a discrete-time manner in time intervals of a controller clock signal, comprising:
    measuring position values in time intervals of a probing clock signal having a higher frequency than the controller clock signal of the processing unit;
    storing the position values in a position-data memory;
    measuring a time span between a pulse of the controller clock signal and an occurrence of the switching signal at the probe head in a time-measuring unit; and
    ascertaining, in one of (a) the processing unit and (b) the position-measuring unit, a position value from the stored position values in position-data memory closest to a time of the switching signal in accordance with the measured time span.

2. The method according to claim 1, wherein the frequency of the probing clock signal is an integral multiple of the frequency of the controller clock signal.

3. The method according to claim 1, wherein the probing clock signal is synchronized with the controller clock signal.

4. The method according to claim 1, wherein the position value is ascertained in the ascertaining step in accordance with the measured time span and in accordance with a position value immediately prior to and a position value immediately after arrival of the switching signal in the processing unit.

5. The method according to claim 1, wherein the position value is ascertained in the ascertaining step in accordance with the position value closest to a time of arrival of the switching signal in the processing unit, a known speed of advance of the probe head and the measured time span.

6. A device for coordinate measurement at a workpiece, comprising:
   a probe head adapted to generate a switching signal in response to contact with the workpiece;
   position-measuring units for each coordinate axis to be measured, a relative position of the probe head measurable with the position-measuring units;
   a processing unit adapted to function in a discrete-time manner in time intervals of a controller clock signal;
   at least one probing clock generator adapted to generate a probing clock signal having a higher frequency than the controller clock signal of the processing unit and controlling measurement of position values in the position-measuring units;
   at least one position-data memory adapted to store position values; and
   a time-measuring unit, the switching signal transmittable to the time-measuring unit, the time-measuring unit adapted to measure a time span between a pulse of the controller clock signal and an arrival of the switching signal;
   wherein at least one of (a) the processing unit and (b) each position-measuring unit includes a determination device adapted to determine a position value in the position-data memory closest to a time of arrival of the switching signal in accordance with the measured time span.

7. The device according to claim 6, wherein each position-measuring unit includes a probing clock generator.

8. The device according to claim 6, wherein the probing clock signal is synchronizable with the controller clock signal.

9. The device according to claim 6, wherein each position-measuring unit includes a position-data memory.

10. The device according to claim 6, further comprising a serial interface unit between the position-measuring units and the processing unit.

11. A device for coordinate measurement at a workpiece, comprising:
    probe head means for generating a switching signal in response to contact with the workpiece;
    position-measuring means for each coordinate axis to be measured, the position-measuring means for measuring a relative position of the probe head means;
    processing means that functions in a discrete-time manner in time intervals of a controller clock signal;
    at least one probing clock generating means for generating a probing clock signal having a higher frequency than the controller clock signal of the processing means and controlling measurement of position values in the position-measuring means;
    at least one position-data memory means for storing position values; and
    time-measuring means, the switching signal transmittable to the time-measuring means, the time-measuring means for measuring a time span between a pulse of the controller clock signal and an arrival of the switching signal;
    wherein at least one of (a) the processing means and (b) each position-measuring means includes determining means for determining a position value in the position-data memory means closest to a time of arrival of the switching signal in accordance with the measured time span.

* * * * *